US010723539B2

(12) United States Patent
Van Kralingen

(10) Patent No.: US 10,723,539 B2
(45) Date of Patent: Jul. 28, 2020

(54) INSULATED SHIPPING CONTAINER FOR WORKS OF ART

(71) Applicant: Turtle B.V., The Hague (NL)

(72) Inventor: Hizkia Van Kralingen, The Hague (NL)

(73) Assignee: TURTLE B.V., The Hague (NL)

( * ) Notice: Subject to any disclaimer, the term of this patent is extended or adjusted under 35 U.S.C. 154(b) by 122 days.

(21) Appl. No.: 15/938,299

(22) Filed: Mar. 28, 2018

(65) Prior Publication Data

US 2018/0282050 A1    Oct. 4, 2018

(30) Foreign Application Priority Data

Mar. 28, 2017   (NL) ..................................... 2018589

(51) Int. Cl.
| | | |
|---|---|---|
| *B65D 81/38* | (2006.01) | |
| *B65D 25/24* | (2006.01) | |
| *B65D 81/113* | (2006.01) | |
| *B32B 1/02* | (2006.01) | |
| *B32B 5/02* | (2006.01) | |

(Continued)

(52) U.S. Cl.
CPC .......... *B65D 81/3823* (2013.01); *B32B 1/02* (2013.01); *B32B 5/022* (2013.01); *B32B 5/18* (2013.01); *B32B 21/047* (2013.01); *B32B 21/08* (2013.01); *B65D 25/24* (2013.01); *B65D 25/28* (2013.01); *B65D 81/113* (2013.01); *B65D 85/30* (2013.01); *B32B 2266/0278* (2013.01); *B32B 2307/304* (2013.01)

(58) Field of Classification Search
CPC ............ B65D 81/23823; B65D 81/113; B65D 25/24; B65D 85/30

USPC ................................. 206/453, 454, 586, 523
See application file for complete search history.

(56) References Cited

U.S. PATENT DOCUMENTS 3,655,034 A * 4/1972 Stollman ................ B65D 81/07
                                                          206/454
4,369,883 A * 1/1983 Stravitz .............. G11B 23/0236
                                                         206/387.15

(Continued)

FOREIGN PATENT DOCUMENTS

DE            93 06 878.6 U1     5/1993
DE      20 2005 011 897 U1     11/2005

(Continued)

OTHER PUBLICATIONS

Office Action in Netherlands Patent Application No. 2018589, dated Dec. 27, 2017.

*Primary Examiner* — Robert Poon
(74) *Attorney, Agent, or Firm* — Venable LLP

(57) ABSTRACT

The invention is directed to a shipping container 1 for transporting works of art 2 comprising an enclosing section 3 obtained by injection moulding and a cover section 7 obtained by injection moulding, retaining means 9 to secure the cover section 7 to the wall sections of the enclosing section 3. The retaining means 9 are not present on at least one wall section 10. The one wall section 10 is not provided with retaining means 9 and is provided with one or more support strips 11 along the length of the side wall 10. The interior of the flat rectangular wall segment and the four wall sections of the enclosing section and at the interior of the cover section a vacuum insulation panel 26 is positioned comprising an air tight envelope and one or more layers of an aerogel core.

15 Claims, 2 Drawing Sheets

(51) Int. Cl.
  *B32B 5/18*    (2006.01)
  *B32B 21/04*   (2006.01)
  *B32B 21/08*   (2006.01)
  *B65D 25/28*   (2006.01)
  *B65D 85/30*   (2006.01)

(56) References Cited

U.S. PATENT DOCUMENTS

| | | | |
|---|---|---|---|
| 4,664,254 A | | 5/1987 | Sitwell et al. |
| 5,518,118 A | * | 5/1996 | Putz ................ B65D 25/10 |
| | | | 206/449 |
| 7,140,508 B2 | | 11/2006 | Kuhn et al. |
| 7,644,820 B2 | * | 1/2010 | Hohne ............. B65D 81/053 |
| | | | 206/449 |
| 9,408,447 B1 | * | 8/2016 | Divinity ............. A45C 13/02 |
| 2007/0095703 A1 | * | 5/2007 | Kao ................ B65D 81/133 |
| | | | 206/454 |
| 2010/0072211 A1 | * | 3/2010 | Dickinson ......... B65D 43/16 |
| | | | 220/592.27 |
| 2013/0240398 A1 | * | 9/2013 | Garner ............. B65D 57/00 |
| | | | 206/454 |
| 2017/0165946 A1 | | 6/2017 | Poupa et al. |

FOREIGN PATENT DOCUMENTS

| | | |
|---|---|---|
| EP | 1 403 193 A1 | 3/2004 |
| NL | 1004045 C1 | 10/1997 |
| WO | 98/44028 A1 | 10/1998 |
| WO | 2012/088299 A2 | 6/2012 |
| WO | 2015/121540 A1 | 8/2015 |
| WO | 2017/016755 A1 | 2/2017 |

* cited by examiner

INSULATED SHIPPING CONTAINER FOR WORKS OF ART

This application claims priority to Netherlands Patent Application No. 2018589, filed Mar. 28, 2017, which is incorporated by reference in its entirety.

BACKGROUND AND DESCRIPTION OF THE INVENTION

The invention is directed to an insulated shipping container for transporting works of art.

Shipping containers for transporting works of art are for example described in U.S. Pat. No. 4,664,254. This publication describes a reusable container made of two halve composite shells. The assembled shells form a space for the work of art. The assembled shells are placed on a specially adapted pallet. The pallet has to be removed before the container can be opened. A disadvantage of this art container is that it is cumbersome to open and close the container.

A more practical and commercially used art container is the so-called Turtle® art container. Turtle® is a registered trademark of Turtle BV in The Netherlands. This art container is made of two halves of composite material and provided with a soft foam at its interior to protect the pieces of art to be transported. Patent publication NL1004045 is related to the Turtle® art container and describes how the works of art are supported by corner pieces which can be positioned and fixed in the container by means of a Velcro type connection.

U.S. Pat. No. 7,140,508 describes a shipping container for transporting works of art which is provided with an insulation consisting of vacuum insulation panels having a core material consisting of silicic acid powders. A problem with the described vacuum insulation panels is that in case the plastic shell material damages silicic acid powder may be discharged from the panel into the shipping container. The powder can come into contact with the works of art and it is not excluded that for example the powder will position itself in the craquelure of tempera or oil paintings.

The object of the present invention is to provide a shipping container which can maintain a temperature within the container for a prolonged period of time while not having the disadvantages of the above described prior art shipping container.

The following shipping container does not have such a disadvantage. A shipping container for transporting works of art comprising:

an enclosing section comprising a flat rectangular wall segment and four wall sections adjoining the flat wall segment, wherein the enclosing section is a single structural element obtained by injection moulding and wherein the flat wall segment and the four wall sections define a space for the works of art to be transported, a cover section comprising a flat rectangular wall section and wherein the cover section is a single structural element obtained by injection moulding, retaining means to secure the cover section to the wall sections of the enclosing section, wherein at the interior of the flat rectangular wall segment and the four wall sections of the enclosing section and at the interior of the cover section a vacuum insulation panel is positioned, and wherein the vacuum insulation panel comprises an air tight envelope and one or more layers of an aerogel as the core material positioned within the air tight envelope.

Applicants found that when a vacuum insulation panel is used with the one or more layers of an organic aerogel no material can escape the panels in case a panel is damaged. This is an important advantage. Further the shipping container can maintain a relatively constant temperature within the container for a prolonged period of time.

The enclosing section and the cover section is suitably separately obtained as a single structural element by vacuum injection moulding of an outer layer of fibre reinforced polymer, a structural core and an inner layer of a fibre reinforced polymer. Examples of suitable polymers are polyester, epoxy resin, vinyl ester resin, acrylic resin, polyurethane, furanic type polymers or phenolic resin. The fibre may be glass fibre reinforcement mats and woven or stiched rovings, aramid or carbon fibre mats and woven or stiched rovings or mats of natural fibres like Flax and hemp. Between the two layers a structural core is present. Examples of suitable structural cores are rigid foams as for example polyurethane foam (PUR foam), polyisocyanurate foam (PIR foam), EPS foam (polystyrene), PVC foam, acrylic foam, PET foam. The structural core preferably has good thermal insulation properties. The thermal conductivity as expressed by the K-value of suitable structural core materials is suitably between 0.015 and 0.04 W/mK and more suitably below 0.035 W/mK.

The structural elements are suitably made by vacuum injection moulding of an outer layer of fibre reinforced polymer, a structural core and an inner layer of a fibre reinforced polymer making use of a mould having the shape of the exterior of the cover section and enclosing section respectively. The layers are placed in the mould in accordance with the desired shape to be achieved and polymer is added under vacuum preferably using a vacuum bag. A pigmented gel coat may be present to cover the outer layer and provide a pigmented appearance of the exterior of the shipping container. Such a layer is suitable added as a first layer onto the mould followed by the outer layer of fibre reinforced polymer, the structural core and the inner layer of a fibre reinforced polymer.

The thickness of the finished outer layer of fibre reinforced polymer, a structural core and an inner layer of a fibre reinforced polymer is suitably between 0.03 and 0.05 m. Too thin would result in a shipping container not having enough strength and insulation capacity and too large would result in a too heavy shipping container.

Preferably the retaining means are not present on at least one wall section. This one wall section which is not provided with retaining means is provided with one or more support strips along the length of the side wall. The cover section and the enclosing section are connected when secured to one another. Suitably the retaining means are present on the two side wall sections adjoining the wall section which is not provided with retaining means. Suitably two or more retaining means are present at these two wall sections. In use these wall sections will face the user when the shipping container is positioned in its preferred vertical orientation. This will thus enable easy access to the retaining means when the user intends to open or close the shipping container.

The above shipping container allows a simple removal of the cover section from the enclosing section while the shipping container itself is vertically positioned on its one or more support strips. Applicants believe that they are the first to provide such a shipping container for works of art which can be opened and filled with a works of art will being vertically positioned. A vertical position is advantageous because less space is required when packing or unpacking and because the works, especially paintings, can be directly placed on a wall of for example a museum without having to rotate the work of art.

Suitably the two side wall sections adjoining the wall section which is not provided with retaining means are provided with a handle. A handle will be used to carry the shipping container. The preferred shipping container is not provided with wheels and will have to be carried. By having handles at the specified side wall sections the shipping container can be carried positioned in its preferred vertical orientation.

The cover section and enclosing section are not linked by hinges or the like. This enables one to remove the cover section in total away from the enclosing section thereby avoiding that the vertically positioned enclosing section can tip over. To enable easy placing of such a separate cover section onto the enclosing section it is preferred that the cover section has a rectangular shape provided with four side ends which ends are flush with the four wall sections of the enclosing section when the cover section and enclosing section are secured by the retaining means.

Suitably the four corners of the enclosing section as defined by the flat rectangular wall segment and four wall sections are provided with a corner buffer. Suitably the four corners of the cover section are provided with a corner buffer. Suitably these corner buffers are made of the same material. Suitable materials are natural or synthetic rubber and polyurethane. Suitably all eight corner buffers extend away in every direction from the secured cover and enclosing sections except from away the wall section which is provided with the support strips.

The support strips are preferably made of a material which has a good mechanical strength. Preferably an engineering plastic is used such as for example acrylonitrile butadiene styrene (ABS), polycarbonates and polyamides (nylons).

Suitably one of the support strips has a flat surface facing the wall section of the enclosing section wherein part of the flat surface is fixed along its length to the wall section and wherein part of the remaining surface of the support strip along its length faces one end of the cover section when the cover section is secured to the enclosing section. Such a design enables one to more easily position the cover section when securing this section to the enclosing section.

Suitably the interior of the flat rectangular wall segment of the cover section and the four wall sections of the enclosing section and the interior of the cover section are at least partly provided with a layer of a deformable foam. This deformable foam will further cushion the work of art when the shipping container is moved. The deformable foam is preferably a foam which also has good insulation properties. The thermal conductivity as expressed by the K-value of the deformable foam is suitably lower than 0.08 W/m-K. Examples of suitable deformable foams are polyurethane foams.

Suitably the rectangular wall segment of the enclosing section is provided with a layer of wood. The layer of preferably untreated wood or untreated plywood is advantageous because it can absorb and desorb moisture and thus assist in keeping the level of moisture within a desired range suitable for the works of art. In effect it serves as a humidity buffer.

The vacuum insulation panel is suitably positioned between the above described layer of foam and the interior of the flat rectangular wall segment and the four wall sections of the enclosing section and the interior of the cover section. Preferably a flat panel is positioned at each of these planes. Such panels may partly overlap at the corner positions at which they meet. More than one individual panels may be used for the flat rectangular wall segment, the four wall sections of the enclosing section and/or the interior of the cover section. In such an embodiment it is not required to divide the area into a plurality of fields by crosspieces in which the individual vacuum insulation panels are located as in U.S. Pat. No. 7,140,508. Applicant found that the vacuum insulation panels may be aligned next to each other in one plane wherein the side ends contact in the absence of such crosspieces. Preferably the individual panels are wrapped by a layer of felt. Such wrapping will at least result in that the side ends of the panel and the side facing the inside of the shipping container are covered by a layer of felt.

In case more than one individual panels are used for at least the flat wall segment, the four wall sections of the enclosing section or the interior of the cover section it is preferred to align the more than one individual panels next to each other in one plane such that their respective side ends directly contact each other or are spaced away by a layer of felt.

The interior of the flat rectangular wall segment of the enclosing section may suitably comprise of the following layers in a sequence starting from the interior of the flat rectangular wall segment: the vacuum insulation panel, a layer of wood and a layer suited to make a Velcro type connection with another sheet. Between the vacuum insulation panel and the layer of wood a layer of felt may be present. The interior of the four wall sections and the interior of the cover section may suitably comprise of the following layers in a sequence starting from the interior of the four wall sections or the interior of the cover section: the vacuum insulation panel and a layer of deformable foam. Between the vacuum insulation panel and the layer of deformable foam a layer of felt may be present.

The vacuum insulation panels comprise of an air tight envelope and one or more layers of an organic aerogel as the core material positioned within the air tight envelope. The aerogel layers may be inorganic aerogels layers like silica aerogels as for example obtainable Aspen Aerogels Inc, USA or organic aerogels like for example isocyanate-based aerogels, polyurethane-, polyurea-, polyamide-, polyimide-, polycarbodiimide- and polyisocyanurate aerogels. Other examples of suitable aerogels are described in International Patent Application Pub. Nos. WO2017016755, WO2015/121540 and WO98/44028, which are all incorporated by reference in their entirety. Such aerogel layers are produced with a certain thickness. In order to further improve the insulating properties, it may be required to combine more than one layer for use in the core. The air tight envelope may be any air tight plastic barrier film. This film suitably comprises at least one layer of reflective aluminium, for further enhancement of the insulating properties.

The thickness of the vacuum insulation panel is preferably smaller than 5 cm, more preferably less than 3 cm. The thermal conductivity as expressed by the K-value of the vacuum insulation panel is suitably lower than 0.01 W/mK and preferably lower than 0.008 W/mK.

In a preferred embodiment a layer suited to make a Velcro type (i.e., hook and loop) connection with another sheet is present on top of the layer of wood. Suitably the container further comprise one or more corner elements which can be fastened to the layer suited to make a Velcro type connection by means of a Velcro type connection as for example described in Netherlands patent publication NL1004045, which is incorporated by reference in its entirety. An advantage of such a system is that the corner pieces can be positioned exactly where they are required to support the work of art. Preferably the corner elements comprise a seat for accommodating the corner of a work of art and wherein the distance between the seat and the layer suited to make a Velcro type connection can be adjusted. In this manner it is possible to adjust the seats of the corner pieces such that a clamping fixation is achieved of the work of art, the corner pieces and the interior of the cover section. Side support elements which can be fastened to the layer suited to make a Velcro type connection by means of a Velcro type connection may also be present. Such side support elements may be used to support works of art which do not have a clear corner, such as work of art having a rounded frame. Such side support elements may also comprise a seat for accommodating the work of art and wherein the distance between the seat and the layer suited to make a Velcro type connection can be adjusted.

BRIEF DESCRIPTION OF THE DRAWINGS

The invention shall be illustrated by FIGS. 1-2.

DETAILED DESCRIPTION OF THE INVENTION

Figure 1:
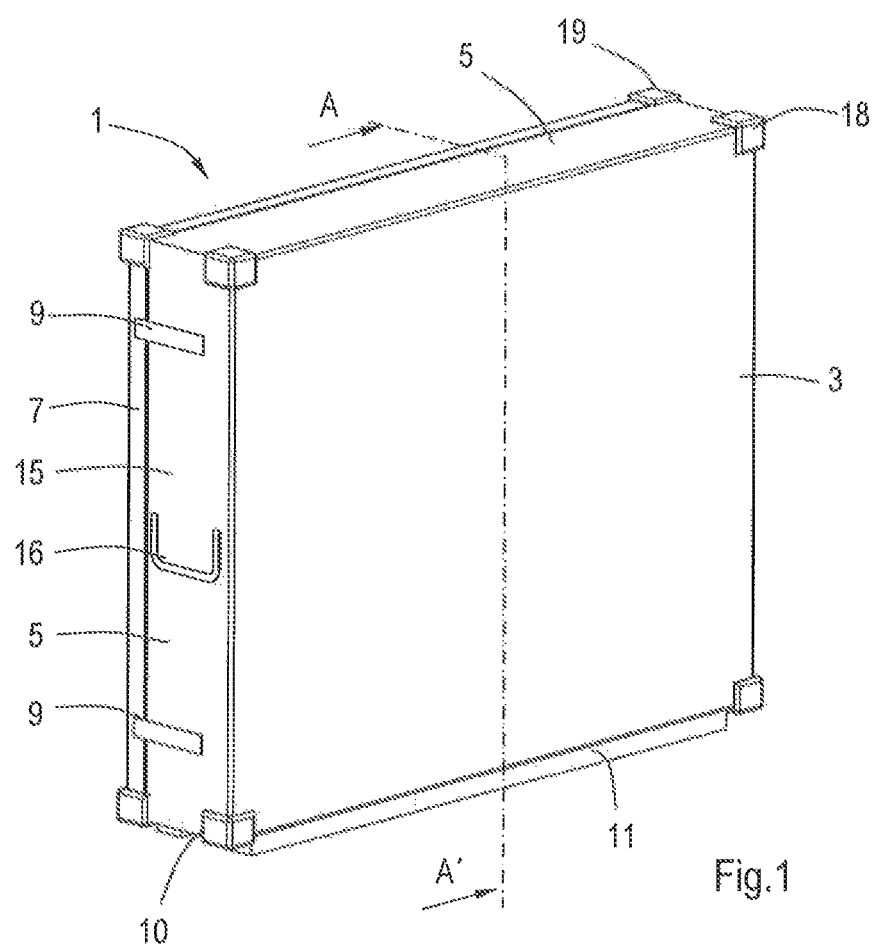
FIG. 1 shows the exterior of the shipping container according to the invention.

FIG. 1 shows a shipping container 1 for transporting works of art 2, an enclosing section 3 comprising a flat rectangular wall segment 4 and four wall sections 5 adjoining the flat wall segment 4. FIG. 1 further shows retaining means 9 to secure the cover section 7 to the wall sections 5 of the enclosing section 3. Retaining means 9 may be clasps or outer suitable suitcase closures. As shown the retaining means 9 are not present on at least one wall section 10. This wall section is provided with two support strips 11 along the length of the side wall 10. Also shown is a handle 16 as present on the two side wall sections 15 adjoining the wall section 10.

FIG. 1 illustrates a shipping container wherein the cover section 7 has a rectangular shape provided with four side ends 17 which ends 17 are flush with the four wall sections 5 of the enclosing section 3 when the cover section 7 and enclosing section 3 are secured by the retaining means 9. The four corners of the enclosing section 7 are provided with a corner buffer 18. The four corners of the cover section are provided with a corner buffer 19.8. As shown all eight corner buffers 18, 19 extend away in every direction from the cover and enclosing sections except from away the wall section 10 which is provided with the support strips 11.

Figure 2:
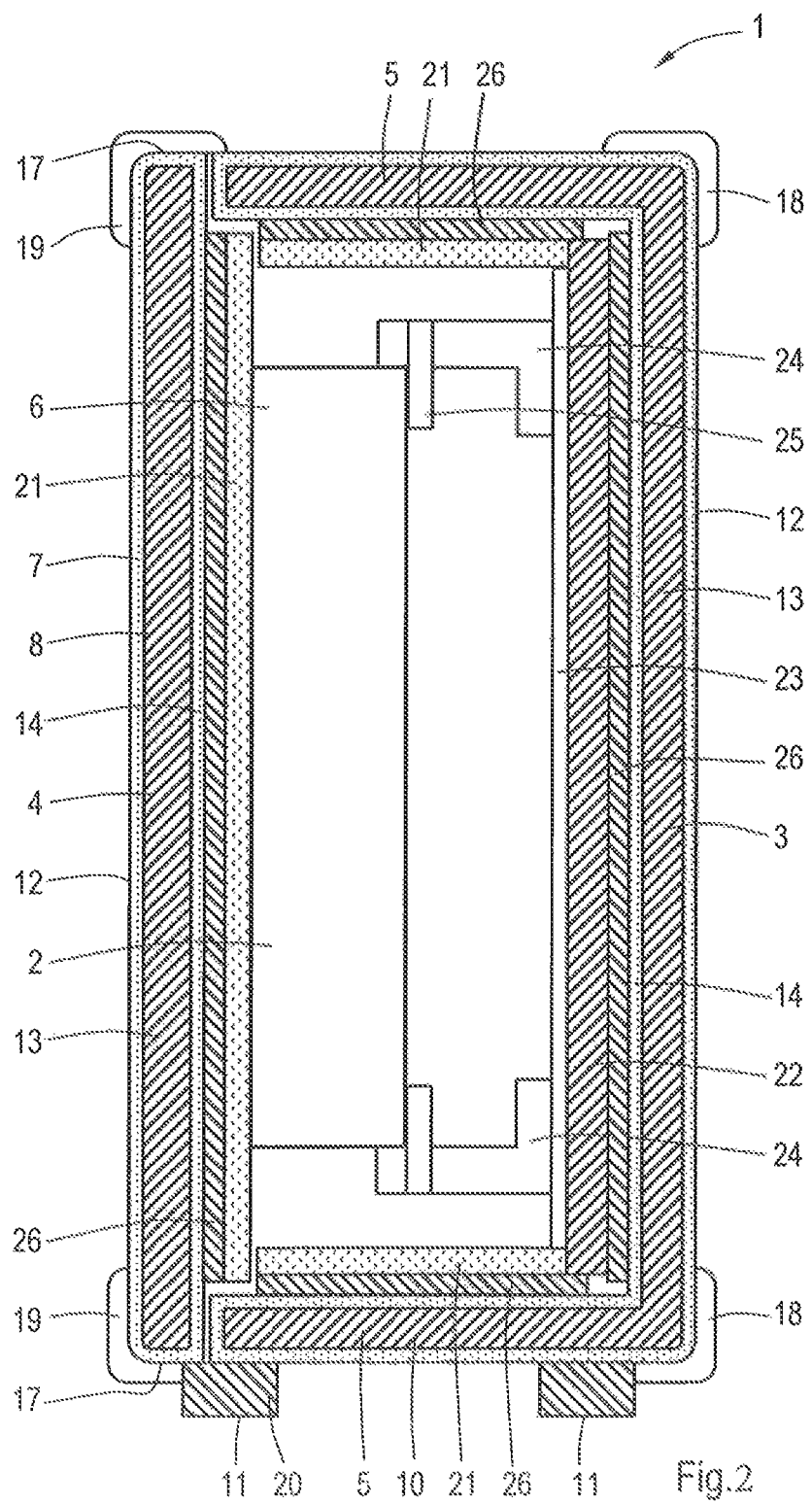
FIG. 2 shows a cross-sectional view AA' as indicated in FIG. 1 for different embodiments of the invention.

FIG. 2 shows the flat wall segment 4 and the four wall sections 5 define a space 6 for the works of art 2 to be transported. Cover section 7 has a flat rectangular wall 8 section. The enclosing section 3 and the cover section 7 is separately obtained as a single structural element by vacuum injection moulding of an outer layer of fibre reinforced polymer 12, a structural core 13 and an inner layer of a fibre reinforced polymer 14.

FIG. 2 shows a support strips 11 having a flat surface facing the wall section 10 of the enclosing section 3. Part of the flat surface is fixed along its length to the side wall 10. Part of the remaining surface of the support strip 20 along its length faces one end 17 of the cover section 7.

FIG. 2 also shows a deformable foam 21 as present on the interior surface of the flat rectangular wall segment 4 and the four wall sections 5 of the enclosing section and on the interior of the cover section 7. Further is shown a layer of wood 22 and a layer 23 suited to make a Velcro type connection with another sheet. To this layer to make a Velcro type of connection a corner element 24 can be fixed by means of a Velcro type connection. Two corner elements 24 are shown supporting a work of art 2. Each corner element is provided with a seat 25 for accommodating the corner of a work of art. The distance between the seat 25 and the layer 23 can be adjusted. Alternatively, the corner element 24 can extend from layer 23 all the way up to deformable foam 21 of cover section 7 to obtain a more stable basis for the work of art 2.

Between the layer of deformable foam 21 at the interior of the flat rectangular wall segment of the cover section 7 a vacuum insulation panel 26 is present. Also between the interior of the four side walls sections 5 of the enclosing section 3 and the layer of deformable foam 21 a vacuum insulation panel 26 is present. Between the interior of the flat rectangular wall segment of the enclosing section 3 and the layer of wood 22 a vacuum insulating panel 26 is present.

The invention claimed is:

1. A shipping container for transporting works of art, the shipping container comprising:
   an enclosing section comprising a flat rectangular wall segment and four wall sections adjoining the flat wall segment, wherein the enclosing section is a single structural element obtained by injection moulding and wherein the flat rectangular wall segment and the four wall sections define a space for the works of art to be transported,
   a cover section comprising a flat rectangular wall section, wherein the cover section is a single structural element obtained by injection moulding, and
   retaining means for securing the cover section to the wall sections of the enclosing section,
   wherein vacuum insulation panels are positioned at an interior of the flat rectangular wall segment and the four wall sections of the enclosing section and at an interior of the cover section,
   wherein the vacuum insulation panels comprise an air tight envelope and one or more layers of an aerogel as a core material positioned within the air tight envelope,
   wherein an interior of the flat rectangular wall segment of the enclosing section comprises the following three layers in sequence starting from the interior of the flat rectangular wall segment: one of the vacuum insulated panels, a layer of wood, and a layer suited to make a hook and loop type connection with another sheet, and
   wherein a layer of felt is present between the one of the vacuum insulated panels and the layer of wood.

2. A shipping container according to claim 1, wherein the retaining means are not present on at least one wall section, and
   wherein the at least one wall section which is not provided with retaining means is provided with one or more support strips along the length of the at least one wall section.

3. A shipping container according to 1, wherein the enclosing section and the cover section are obtained as a single structural element by vacuum injection moulding of an outer layer of fibre reinforced polymer, a structural core, and an inner layer of a fibre reinforced polymer.

4. A shipping container according to claim 3, wherein a pigmented gel coat is present to cover the outer layer and provide a pigmented appearance on the exterior of the shipping container.

5. A shipping container according to claim 1, wherein handles are provided on two of the wall sections.

6. A shipping container according to claim 1, wherein the cover section has a rectangular shape provided with four side ends that are flush with the four wall sections of the enclosing section when the cover section and enclosing section are secured by the retaining means.

7. A shipping container according to claim 6, wherein four corners of the enclosing section, as defined by the flat rectangular wall segment and four wall sections, are provided with a corner buffer, and
    wherein four corners of the cover section are provided with a corner buffer.

8. A shipping container according to claim 7, wherein all eight corner buffers extend away in every direction from the secured cover and enclosing sections except from in a direction away from a wall section which is provided with support strips.

9. A shipping container according to claim 2, wherein one of the support strips has a flat surface facing the at least one wall section of the enclosing section,
    wherein part of the flat surface is fixed along its length to the at least one wall section, and
    wherein part of the remaining flat surface of the support strip along its length faces one end of the cover section when the cover section is secured to the enclosing section.

10. A shipping container according to claim 1, wherein interiors of the four wall sections and an interior of the cover section comprise the following layers in a sequence starting from the interiors of the four wall sections or the interior of the cover section:
    one of the vacuum insulation panels and a layer of deformable foam.

11. A shipping container according to claim 10, wherein a layer of felt is present between the one of the vacuum insulation panels and the layer of deformable foam.

12. A shipping container according to claim 1, wherein the shipping container further comprises one or more corner elements which can be fastened to the layer suited to make a hook and loop type connection.

13. A shipping container according to claim 12, wherein the corner elements comprise a seat for accommodating a corner of a work of art, and
    wherein the distance between the seat and the layer suited to make the hook and loop type connection can be adjusted.

14. A shipping container in combination with a painting, wherein the shipping container is a shipping container according to claim 1.

15. A shipping container according to claim 1, wherein the retaining means is clasps.

* * * * *